Oct. 19, 1926. 1,603,818
N. SULENTIC
SPRING RECEIVING AND MANIPULATING CLIP
Filed Oct. 26, 1923
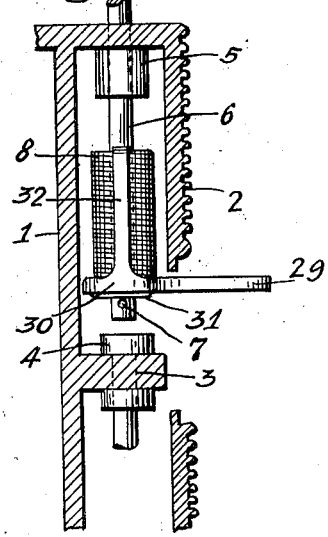
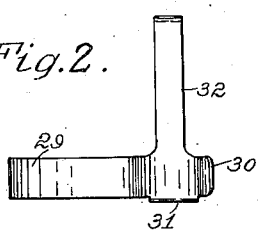
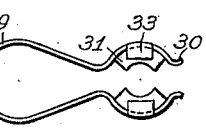
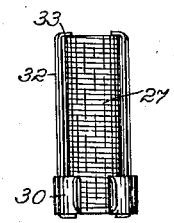
Inventor,
Nicholas Sulentic, by
Attorney.

Patented Oct. 19, 1926.

1,603,818

UNITED STATES PATENT OFFICE.

NICHOLAS SULENTIC, OF WATERLOO, IOWA.

SPRING RECEIVING AND MANIPULATING CLIP.

Application filed October 26, 1923. Serial No. 670,810.

My invention relates to improvements in spring receiving and manipulating clips, and the object of my improvement is to supply a receiving holder for a compressed spring removed from a valve-stem by a compressing device for use in returning the spring to the valve-stem after the latter is re-seated.

The above object has been accomplished by the means which are hereinafter described and claimed, and which are illustrated in the accompanying drawings, in which Fig. 1 is a fragmental cross section of a spring and valve-stem receiving compartment of an engine block, showing said spring and valve-stem, also my clip device mounted thereon, in elevation. Fig. 2 is a side elevation on a larger scale of the spring-holder. Fig. 3 is a top plan view of the latter, and Fig. 4 is a front elevation of said holder, showing it holding a coiled and compressed valve-spring.

I provide a spring clip, made and bent from a single piece of resilient metal plate and having a medial curved bend 29 to serve as a handle or fingerhold. The members of this fingerhold converge and the plate members are then bent and shaped into forked clips resembling the forked clips 22—23 on the U-shaped frame 1, with the semi-circular parts 30 and the single plane ledges 31 being like the other clips 22 and ledges 23, but integral standards 32 rise from the middles of the clip parts 30 and have their upper ends bent toward each other in alinement at 33 to provide top holders for a received coiled compression spring 27.

My invention is used as follows. The operator takes the fingerhold 29 of the spring-holder shown in Figs. 3 to 5 and seats the clips yieldingly at 30 about the lower part of the spring shown in dotted lines in Fig. 1, the ledges 31 supporting the lower end of the spring or its basal washer the inwardly curved walls of the forks 30 grasping the spring, and the inner curved edges of the pair of curvate flanges or ledges 31 so embracing the valve-stem as to prevent accidental removals of the ledges 31 therefrom, while the inturned extremities 33 engage the upper end of the compressed spring.

It is well known to those skilled in the art to which this invention appertains, that in certain types of cylinder blocks for motor vehicle internal combustion engines where coiled compression springs are mounted upon the valve-stems, because of permanent covering parts over such springs the aperture of the block at that location is so narrow and so placed that only a small part of the springs can be manipulated from without by a tool in placing the spring upon the stem in each case, or in removing it therefrom. This type of block is becoming very much used on motor car engines, and appears to be the coming kind for general use.

In manipulating such valve-stem springs in this type of blocks, it has been found that a spring clip cannot be employed which has a shape which prevents its use through such a restricted aperture in the block where only the extreme lower end of the springs are uncovered by said aperture. My spring clip is used in such cases, by tilting it in inserting it with its contained compressed spring to slip the spring over the lower end of the valve-stem and then guide it upwardly to seat it over the stem so that the spring-retaining pin may be inserted in the stem hole below the spring; and the clip can be removed by tilting the clip so that its upper standards may slip off the spring while the lower arcuate furcations still grasp the lower end of the spring, and then the furcations may be slipped from the spring while the clip is tilted to allow removal through said block aperture.

In removing a spring from the stem after the spring has been previously compressed and held compressed by another device, the clip is tilted to get it through said block aperture and to first slip its standard terminals over the upper end of the spring before engaging the lower furcations with the lower sides of the spring. The compressing device then being released from the spring and valve-head, the clip may be used to remove the spring when the stem is lifted, the clip being tilted to get it out by way of said aperture without interference, because said standards are directed angularly from one edge only of the furcations. My advice therefore is particularly adapted for the above employments, as specialized therefor.

Having described my invention, what I claim as new, and desire to secure by Letters Patent, is:

A device for either mounting a coiled compressed compression spring upon or removing it from a traversing valve-stem positioned within an inclosure with a restricted aperture, comprising a pair of like furcations connected for to and fro separation and having along one edge of each an inturned ledge, said furcations having each an angularly directed non-interfering standard opposed laterally to each other with inturned terminations opposed longitudinally to said ledges, said furcations shaped to yieldingly retain one end of the contained spring while the other end of the spring is either inserted or removed tiltingly from between the said non-interfering standards.

Signed at Waterloo, Iowa, this 25th day of Sept., 1923.

NICHOLAS SULENTIC.